(12) United States Patent
Sato

(10) Patent No.: US 7,653,973 B2
(45) Date of Patent: *Feb. 2, 2010

(54) PRODUCTION METHOD OF MULTILAYER ELECTRONIC DEVICE

(75) Inventor: Shigeki Sato, Narita (JP)

(73) Assignee: TDK Corporation, Tokyo (JP)

( * ) Notice: Subject to any disclaimer, the term of this patent is extended or adjusted under 35 U.S.C. 154(b) by 352 days.

This patent is subject to a terminal disclaimer.

(21) Appl. No.: 11/630,697

(22) PCT Filed: Jun. 24, 2005

(86) PCT No.: PCT/JP2005/011588

§ 371 (c)(1),
(2), (4) Date: Dec. 27, 2006

(87) PCT Pub. No.: WO2006/001359

PCT Pub. Date: Jan. 5, 2006

(65) Prior Publication Data

US 2009/0007404 A1    Jan. 8, 2009

(30) Foreign Application Priority Data

Jun. 28, 2004  (JP) .............................. 2004-190254

(51) Int. Cl.
*H01G 7/00* (2006.01)
*H01G 4/30* (2006.01)
(52) U.S. Cl. .................. 29/25.42; 29/830; 29/831; 29/25.41; 156/89.16; 156/89.12; 361/305; 361/311

(58) Field of Classification Search ..... 29/25.01–25.03, 29/25, 35–25.42, 830–831, 846–847; 156/89.11–89.12, 156/89.16, 89.23, 235, 239; 361/303, 311, 361/313, 321.5; 174/255, 262
See application file for complete search history.

(56) References Cited

U.S. PATENT DOCUMENTS

| 6,550,117 | B1 * | 4/2003 | Tokuoka et al. ............. 29/25.42 |
| 6,602,370 | B1 * | 8/2003 | Kuramitsu et al. ......... 156/89.12 |
| 6,791,036 | B1 * | 9/2004 | Chen et al. .................. 174/257 |
| 6,941,648 | B2 * | 9/2005 | Shimizu et al. ............... 29/830 |
| 7,491,283 | B2 * | 2/2009 | Karatsu et al. ............ 156/89.14 |

FOREIGN PATENT DOCUMENTS

| JP | A 63-51616 | 3/1988 |
| JP | A 3-079007 | 4/1991 |
| JP | A 3-250612 | 11/1991 |

(Continued)

*Primary Examiner*—Minh Trinh
(74) *Attorney, Agent, or Firm*—Oliff & Berridge, PLC

(57) ABSTRACT

A production method of a multilayer electronic device, comprising the steps of forming an electrode layer 12a on a first support sheet 20; forming a green sheet 10a on a surface of the electrode layer 12a to obtain a green sheet 10a having an electrode layer 12a; stacking the green sheets 10a, each having the electrode layer 12a, to form a green chip; and firing the green chip: wherein before stacking the green sheet 10a having the electrode layer 12a, an adhesive layer 28 is formed on a surface on the opposite side of the electrode layer side of the green sheet 10a having the electrode layer 12a; and the green sheet 10a having the electrode layer 12a formed thereon is stacked via the adhesive layer 28.

10 Claims, 7 Drawing Sheets

FOREIGN PATENT DOCUMENTS

| | | |
|---|---|---|
| JP | A 5-101970 | 4/1993 |
| JP | A 5-159966 | 6/1993 |
| JP | A 7-297073 | 11/1995 |
| JP | A 7-312326 | 11/1995 |
| JP | A 8-037128 | 2/1996 |
| JP | A 10-050552 | 2/1998 |
| JP | A 11-144992 | 5/1999 |
| JP | A 2003-264120 | 9/2003 |
| JP | A 2003-272947 | 9/2003 |
| JP | A 2004-103983 | 4/2004 |
| JP | A 2004-111635 | 4/2004 |
| JP | A 2004-114632 | 4/2004 |
| JP | A 2004-119802 | 4/2004 |
| JP | A 2004-179348 | 6/2004 |

* cited by examiner

PRODUCTION METHOD OF MULTILAYER ELECTRONIC DEVICE

TECHNICAL FIELD

The present invention relates to a production method of a multilayer electronic device, such as a multilayer ceramic capacitor, and particularly relates to a production method of a low-cost multilayer electronic device having excellent stacking property (adhesiveness in stacking), capable of effectively preventing a sheet attack caused by a solvent in slurry and reducing nonadhesion defects (nonlamination) and a short-circuiting defect rate even when a green sheet is formed to be extremely thin.

BACKGROUND ART

In recent years, as a result that a variety of electronic apparatuses have become more compact, electronic devices to be installed inside the electronic apparatuses have been made furthermore compact and to have higher performance. As one of the electronic devices, there is a multilayer ceramic capacitor, which has been also required to be more compact and to have higher performance.

To pursue attaining of a more compact multilayer ceramic capacitor with a higher capacity, dielectric layers are strongly required to be thinner and, recently, a thickness of a dielectric green sheet for forming the dielectric layers after firing is also made thin as several μm or thinner.

To produce a dielectric green sheet, normally, green sheet slurry formed by a dielectric powder, binder, plasticizer and organic solvent (toluene, alcohol and MEK, etc.) is prepared first. Then, the green sheet slurry is applied to a carrier film, such as PET, by using the doctor blade method, etc. and heated to dry.

In recent years, a method of preparing a ceramic suspension obtained by mixing a dielectric powder and a binder in a solvent and performing biaxial stretching on a film-shaped mold obtained by performing extruding on the suspension has been studied.

A method of producing a multilayer ceramic capacitor by using the ceramic green sheet as above will be explained. Internal electrode paste including a metal powder and a binder is printed in a predetermined pattern and dried to form an internal electrode pattern. Next, a carrier sheet is removed from the ceramic green sheet, and the results are stacked and cut into a chip shape to obtain a green chip. Then, after firing the green chip, external electrodes are formed.

However, when directly printing the internal electrode paste on the green sheet, a solvent in the internal electrode paste soaks into the green sheet and a phenomenon called a sheet attack arises. The sheet attack due to soaking by the solvent causes pin holes on the green sheet and often causes short-circuiting defects. Particularly, when the dielectric green sheet is formed to be extremely thin, effects of the sheet attack become notable, so that an interlayer thickness of the sheet has been hard to be made thin.

On the other hand, in the patent articles 1 to 4 below, a dry type electrode pattern is separately prepared by forming an internal electrode pattern on a support sheet and drying. And an internal electrode pattern transfer method for transferring the dry type electrode pattern to a surface of each dielectric green sheet or a surface of a multilayer body of the dielectric green sheet has been proposed.

In the technique described in the patent articles 1 to 4, however, particularly when a thickness of the green sheet is thin, there have been problems that it is extremely difficult to bond an electrode pattern layer with a surface of the green sheet well and transfer with high accuracy and, in the transfer step, the dielectric sheet partially breaks and results in arising a short-circuiting defect. Furthermore, when the green sheets each having an electrode pattern layer formed thereon directly stacked as in the patent articles 1 to 4, there has been a problem that an adhesive force between the internal electrode formation surface and the green sheet surface becomes insufficient to cause adhesion defect.

To eliminate the nonadhesion defects and short-circuiting defects, for example, the patent articles 5 to 7 disclose a method wherein a green sheet configured to be sandwiched by green sheet layers from the above and below is formed as a green sheet having an internal electrode pattern and stacked. In the method described in the articles, for example, green sheet layers having about a half thickness of a desired thickness are bonded and the desired thickness (a thickness of one layer) is attained. In this method, green sheets layers are bonded when stacking, so that an adhesive force between the sheets can be improved and short-circuiting defects caused by a pin hole can be reduced. However, in this method, the green sheet layer has to be made extremely thin as about half thickness of the desired thickness, so that it has been difficult to respond to demands for further thinner layers.

Also, the patent articles 8 to 13 disclose a method wherein a green sheet formed by overlapping two or more green sheet layers is used as a green sheet having an internal electrode pattern and stacked. These articles describe that short-circuiting defects and delamination can be suppressed. However, in the method disclosed in these articles, each green sheet layer has to be furthermore thinner when making the green sheet itself thinner, so that it has been difficult to respond to demands for a further thinner green sheet.

Particularly, in these articles, a green sheet formed by overlapping two or more green sheets each having a thickness of several μm or so is used. Namely, 2 to 3 layers of green sheets each having a thickness of 2 to 3 μm or so in the patent articles 5 and 6, two green sheet layers having a thickness of 6 to 7 μm or so in the patent articles 7 and 8, a green sheet layer having a thickness of 3 to 3.4 μm or so and a green sheet layer having a thickness of 0.6 to 1 μm were overlapped to form a green sheet in the patent articles 9 and 10. Therefore, it has been difficult to respond to demands for further thinner layers for these articles.

Patent Article 1: The Japanese Unexamined Patent Article No. 63-51616

Patent Article 2: The Japanese Unexamined Patent Article No. 3-250612

Patent Article 3: The Japanese Unexamined Patent Article No. 5-159966

Patent Article 4: The Japanese Unexamined Patent Article No. 7-312326

Patent Article 5: The Japanese Unexamined Patent Article No. 7-297073

Patent Article 6: The Japanese Unexamined Patent Article No. 2004-103963

Patent Article 7: The Japanese Unexamined Patent Article No. 2004-119802

Patent Article 8: The Japanese Unexamined Patent Article No. 10-50552

Patent Article 9: The Japanese Unexamined Patent Article No. 11-144992

Patent Article 10: The Japanese Unexamined Patent Article No. 8-37128

Patent Article 11: The Japanese Unexamined Patent Article No. 5-101970

Patent Article 12: The Japanese Unexamined Patent Article No. 2003-264120

Patent Article 13: The Japanese Unexamined Patent Article No. 2003-272947

DISCLOSURE OF THE INVENTION

Problem to be Solved by the Invention

An object of the present invention is to provide a production method of a low-cost multilayer electronic device, such as a multilayer ceramic capacitor, having an excellent stacking property (adhesiveness in stacking) and capable of effectively preventing a sheet attack due to a solvent included in slurry, reducing nonadhesion defects (nonlamination) and lowering a short-circuiting defect rate even when a green sheet is made to be extremely thin.

Means for Solving the Problem

The present inventors have been committed themselves to study for attaining the above objects, found that the object of the present invention could be attained by forming an adhesive layer on the opposite surface of an electrode layer side surface of a green sheet having an electrode layer and stacking the green sheets each having an electrode layer via the adhesive layers, and completed the present invention.

Namely, according to the present invention, there is provided a production method of a multilayer electronic device, comprising the steps of:

forming an electrode layer on a first support sheet;

forming a green sheet on a surface of the electrode layer to obtain a green sheet having an electrode layer;

stacking the green sheets, each having the electrode layer, to form a green chip; and firing the green chip;

wherein before stacking the green sheet having the electrode layer, an adhesive layer is formed on a surface on the opposite side of the electrode layer side (an opposite surface of the surface formed with the electrode layer) of the green sheet having the electrode layer; and the green sheet having the electrode layer formed thereon is stacked via the adhesive layer.

In the production method of the present invention, an adhesive layer is formed on the opposite side of an electrode layer side surface of a green sheet having an electrode layer, and the green sheet each having an electrode layer are stacked via the adhesive layer so as to form a green chip. By stacking via an adhesive layer, a stacking property (adhesiveness in stacking) can be improved, nonadhesion (nonlamination) and adhesion defects can be prevented. Moreover, in the present invention, first, an electrode layer is formed on the first support sheet and, then, a green sheet is formed on a surface of the electrode layer, so that a green sheet having the electrode layer is produced. Therefore, soaking of a solvent to the green sheet (sheet attack), which has been a notable disadvantage when directly printing internal electrode paste on the green sheet, can be effectively prevented, and a short-circuiting defect rate can be lowered. Also, soaking of the solvent can be prevented, so that a composition of the electrode layer or the green sheet is not adversely affected.

Furthermore, in the present invention, since the green sheets each having an electrode layer are stacked via an adhesive layer, a high pressure and heat become unnecessary and adhesion at a low pressure and a low temperature can become possible. Furthermore, even when the green sheet is extremely thin, the green sheet does not break and can be preferably stacked.

In the present invention, the green sheet can be formed on a surface of the electrode layer without using an adhesive layer. As a method of forming the green sheet, for example, a thick film formation method, such as a coating method using dielectric paste, or a thin film formation method, such as a vapor deposition method and sputtering, may be mentioned. It is particularly preferable to form by a die coating method using a die coater. When forming the green sheet on the surface of the electrode layer without using an adhesive layer, the production steps can be simplified and the production costs can be reduced. Moreover, in this case, the green sheet each having an electrode layer are stacked via the adhesive layers, the stacking property (adhesion in stacking) can be maintained high in the present invention.

Preferably, a thickness of the adhesive layer is 0.02 to 0.3 µm, more preferably 0.05 to 0.1 µm.

In the present invention, the thickness of the adhesive layer is preferably in the above range in terms of preventing delamination and cracks. When the thickness of the adhesive layer is too thin, a thickness of the adhesive layer becomes thinner than concaves and convexes on the green sheet surface and the adhesiveness tends to decline remarkably. While when the thickness of the adhesive layer is too thick, a clearance easily arise inside a sintered element body depending on the thickness of the adhesive layer, which may cause a start point of a crack and capacitance for that volume tends to decline remarkably. Also, when forming a thicker adhesive layer than an average particle diameter of the dielectric particles included in the green sheet, a clearance easily arise inside a sintered element body depending on the thickness of the adhesive layer and capacitance for that volume tends to decline remarkably.

Preferably, a thickness of the green sheet is 1.5 µm or thinner, and a thickness of an adhesive layer is $1/10$ of the thickness of the green sheet or thinner. Also preferably, a thickness of the electrode layer is 1.5 µm or thinner. According to the present invention, even when the green sheet and electrode layers are formed to be thin as the thicknesses as above, a high stacking property can be obtained, and nonadhesion defects and a short-circuiting defect rate can be reduced.

Furthermore, in the present invention, a total thickness of the green sheet and the electrode layer is preferably 3.0 µm or thinner. The effects of the present invention are enhanced particularly when the thicknesses of the green sheet and electrode layer are in the above ranges.

Note that, in the present invention, thicknesses of the adhesive layer, green sheet and electrode layer mean thicknesses when dried.

Preferably, the green sheet includes dielectric particles having barium titanate as its main component and an average particle diameter of the dielectric particles is 0.3 µm or smaller. When an average particle diameter of the dielectric particles is too large, it is liable that a thin green sheet is hard to be formed.

Preferably, the green sheet includes an acrylic resin and/or a butyral based resin as a binder. When forming a thin green sheet, it is possible to form a thin green sheet having sufficient strength by using such a binder.

Preferably, the adhesive layer includes substantially the same organic polymer material as that in the binder included in the green sheet. It is because the binder is removed from the chip by binder removal processing under the same condition when performing binder removal processing on the green chip.

Preferably, the adhesive layer includes a plasticizer, and the plasticizer is at least one of phthalate ester, glycol, adipic acid and phosphate ester. By including a plasticizer of this kind in a predetermined amount, preferable adhesiveness can be brought out.

Preferably, the adhesive layer includes an antistatic agent, and the antistatic agent includes one of imidazoline based surfactants. Na adding quantity of the antistatic agent based on weight is not larger than an adding quantity of the organic polymer material based on weight. By including an antistatic agent of this kind in a predetermined amount, the antistatic effect can be obtained.

The adhesive layer may include dielectric particles. The dielectric particles has the same or smaller average particle diameter comparing with that of dielectric particles included in the green sheet and may include substantially the same kind of dielectric composition as that included in the green sheet. Since the adhesive layer becomes a part of the element body after firing, it is preferable that substantially the same kind of dielectric particles as those included in the green sheet is included. Note that an average particle diameter of the dielectric particles are preferably the same or smaller because the thickness has to be controlled.

Preferably, an adding ratio based on weight of the dielectric particles included in the adhesive layer is smaller than an adding ratio of dielectric particles included in the green sheet. It is to maintain preferable adhesiveness of the adhesive layer.

Preferably, the electrode layer is formed in a predetermined pattern on a surface of the first support sheet, a blank pattern layer having substantially the same thickness as that of the electrode layer is formed on a surface of the first support sheet without being formed the electrode layer, and the blank pattern layer is formed by substantially the same material as that of the green sheet. Namely, in the present invention, it is preferable by forming the electrode layer and the blank pattern layer on the first support sheet in advance, an electrode layer in a predetermined pattern and a blank pattern layer having a complementary pattern thereof are formed on a surface of the green sheet.

By forming the blank pattern layer on a part where an electrode layer is not formed, a level difference on the surface due to the electrode layer in a predetermined pattern is eliminated. Therefore, even if a pressure is applied after stacking a large number of green sheets and before firing, outer surfaces of the multilayer body is maintained to be plane, positional deviation of the electrode layers in the surface direction is not caused, moreover, short-circuiting due to breaking of the green sheets is not caused. Note that, in the present invention, the blank pattern layer means a dielectric layer formed in a complementary pattern of the electrode layer.

Preferably, before stacking the green sheet having the electrode layer, the first support sheet is released from the green sheet having the electrode layer; and stacking on another green sheet a surface on the electrode layer side of the green sheet having the electrode layer in a state where the first support sheet was released.

Alternately, preferably, an opposite surface of the electrode layer side of the green sheet having the electrode layer is stacked on another green sheet in a state of having the first support sheet; and after stacking the green sheets having the electrode layer, releasing the first support sheet from the green sheet having the electrode layer formed thereon.

In the present invention, preferably, the adhesive layer is formed by a transfer method or coating method.

When forming the adhesive layer by the transfer method,

Preferably, the adhesive layer is first formed to be able to be released on a surface of a second support sheet and transferred to a surface on the opposite side of the electrode layer side of the green sheet having the electrode layer by being pressed against it.

By forming the adhesive layer by the transfer method, soaking of components of the adhesive layer through the electrode layer and/or green sheet can be effectively prevented. Therefore, compositions of the electrode layers and/or green sheets are not adversely affected. Furthermore, even when the adhesive layer is formed to be thin, components of the adhesive layer do not soak through the electrode layers and/or green sheets, so that adhesiveness can be maintained high.

Alternately, when forming the adhesive layer by a coating method, preferably, the adhesive layer is formed by applying the electrode layer directly to the surface on the electrode layer side of the green sheet having the electrode layer formed thereon by a die coating method.

By forming the adhesive layer by a die coating method using a die coater, a use amount of PET film can be reduced, time required for forming an adhesive layer can be made short, and the lead time and tact can be made short comparing with those in the case of forming the adhesive layer by a transfer method.

The multilayer electronic device produced by the present invention is not particularly limited and, for example, a multilayer ceramic capacitor and multilayer inductor element, etc. may be mentioned.

In the present invention, the term "electrode layer" is used as a concept including an electrode paste film to be an internal electrode layer after firing.

EFFECTS OF THE INVENTION

According to the present invention, an adhesive layer is formed on the opposite side of the electrode layer side of the green sheet having the electrode layer and the green sheets having the electrode layer are stacked via the adhesive layer, so that it is possible to provide a low-cost production method of a multilayer ceramic capacitor and other multilayer electronic device having an excellent stacking property (adhesiveness in stacking) and capable of reducing nonadhesion defects (nonlamination) even when the green sheet is formed to be extremely thin. Furthermore, in the present invention, a green sheet having an electrode layer is produced by forming an electrode layer on a first support sheet and, then, forming a green sheet on a surface of the electrode layer, so that soaking of a solvent included in slurry into the green sheet (a sheet attack) can be effectively prevented and a short-circuiting defect rate can be lowered.

DESCRIPTION OF THE PREFERRED EMBODIMENT

Below, the present invention will be explained based on embodiments shown in drawings.

First, as an embodiment of an electronic device produced by the method according to the present invention, an overall configuration of a multilayer ceramic capacitor will be explained.

Figure 1:
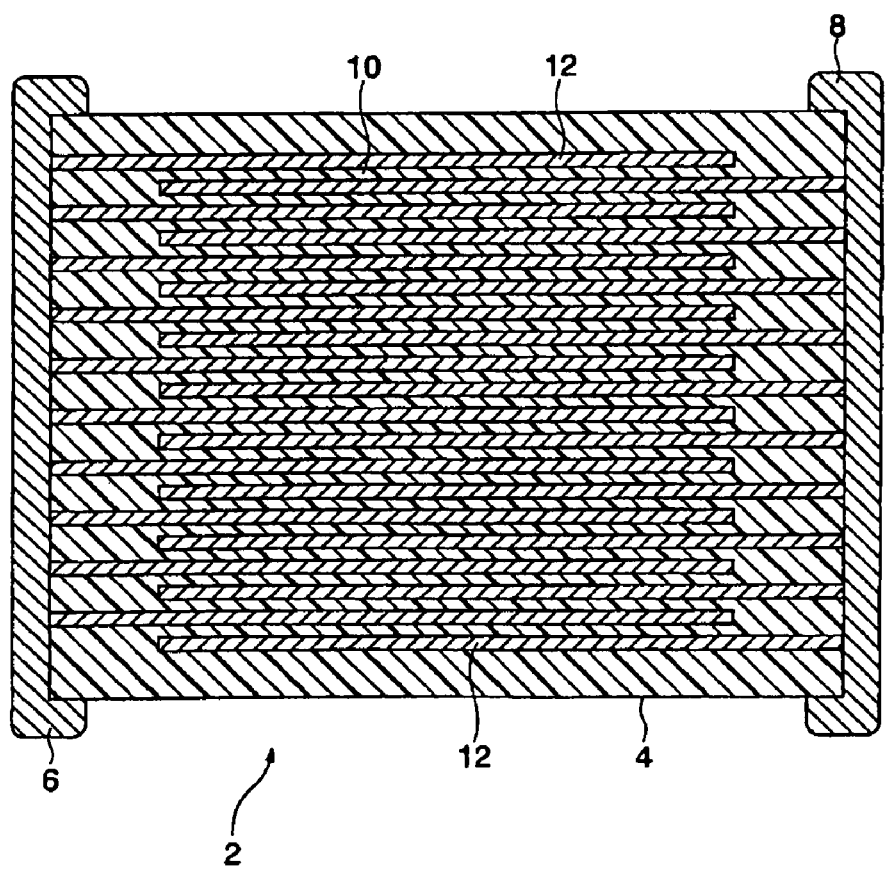
FIG. 1 is a schematic sectional view of a multilayer ceramic capacitor according to an embodiment of the present invention.

As shown in FIG. 1, a multilayer ceramic capacitor 2 according to the present embodiment comprises a capacitor element body 4, a first terminal electrode 6 and a second terminal electrode 8. The capacitor element body 4 comprises dielectric layers 10 and internal electrode layers 12, and the internal electrode layers 12 are alternately stacked between the dielectric layers 10. The alternately stacked internal electrode layers 12 on one side are electrically connected to inside of the first terminal electrode formed outside of a first end portion of the capacitor element body 4. Also, the alternately stacked internal electrode layers 12 on the other side are electrically connected to inside of the second terminal electrode 8 formed outside of a second end portion of the capacitor element body 4.

Figure 2A:
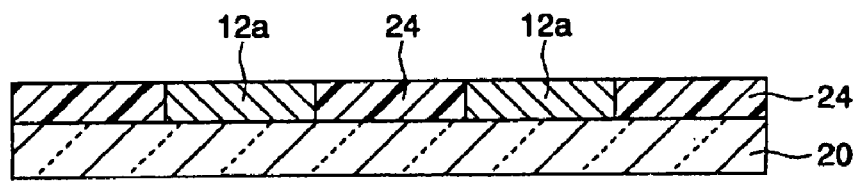
FIG. 2A is a sectional view of a key part showing a formation method of an electrode layer according to an embodiment of the present invention.
Figure 2B:
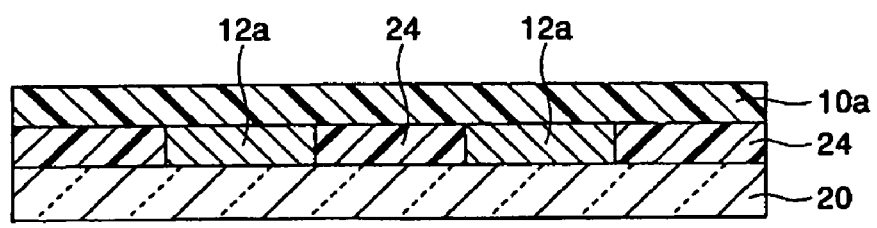
FIG. 2B is a sectional view of a key part showing a step continued from FIG. 2A.

In the present embodiment, the internal electrode layer 12 is formed by forming an electrode layer 12a in a predetermined pattern on a carrier sheet 20 as shown in FIG. 2A and FIG. 2B as will be explained later on.

A material of the dielectric layers 10 is not particularly limited and it may be composed of dielectric materials, such as calcium titanate, strontium titanate and/or barium titanate. A thickness of each dielectric layer 10 is not particularly limited but is generally several µm to hundreds of µm. Particularly in this embodiment, it is made as thin as preferably 3 µm or thinner, and more preferably 1.5 µm or thinner.

Also, a material of the terminal electrodes 6 and 8 is not particularly limited and copper, copper alloys, nickel and nickel alloys, etc. are normally used. Silver and an alloy of silver and palladium, etc. may be also used. A thickness of the terminal electrodes 6 and 8 is not particularly limited and is normally 10 to 50 µm or so.

A shape and size of the multilayer ceramic capacitor 2 may be suitably determined in accordance with the use object. When the multilayer ceramic capacitor 2 is a rectangular parallelepiped shape, it is normally a length (0.6 to 5.6 mm, preferably 0.6 to 3.2 mm)×width (0.3 to 5.0 mm, preferably 0.3 to 1.6 nm)×thickness (0.1 to 1.9 mm, preferably 0.3 to 1.6 mm) or so.

Next, an example of a production method of the multilayer ceramic capacitor 2 according to the present embodiment will be explained.

First, electrode paste is prepared for producing an electrode layer for composing the internal electrode layer 12 shown in FIG. 1 after firing.

The electrode paste is fabricated by kneading conductive materials composed of a variety of conductive metals and alloys, or a variety of oxides, organic metal compounds or resonates, etc. to be the conductive materials as above after firing with an organic vehicle.

As a conductor material to be used for producing the electrode paste, Ni, a Ni alloy or a mixture of these is used. A shape of the conductor material is not particularly limited and may be a sphere shape, a scale shape or a mixture of these shapes. Also, a conductor material having an average particle diameter of normally 0.1 to 2 µm, and preferably 0.2 to 1 µm or so may be used.

An organic vehicle includes a binder and a solvent. As the binder, for example, ethyl cellulose, an acrylic resin, polyvinyl butyral, polyvinyl acetal, polyvinyl alcohol, polyolefin, polyurethane, polystyrene or copolymers of these, etc. may be mentioned. Among them, ethyl cellulose, polyvinyl butyral and other butyrals are preferable.

The binder is included preferably in an amount of 4 to 10 parts by weight with respect to 100 parts by weight of the conductor material (metal powder). As the solvent, any of well known solvents, for example, terpineol, butyl carbitol, kerosene, acetone, isobornyl acetate, etc. may be used. A content of the solvent is preferably 20 to 55 wt % with respect to the entire paste.

To improve the adhesiveness, the electrode paste preferably includes a plasticizer or an adhesive agent. As a plasticizer, dioctyl phthalate, benzilbutyl phthalate and other phthalate esters, adipic acid, phosphorous ester and glycols, etc. may be mentioned. An adding quantity of the plasticizer is preferably 10 to 300 parts by weight, more preferably 10 to 200 parts by weight with respect to 100 parts by weight of the binder. Note that when the adding quantity of the plasticizer or adhesive agent is too large, it is liable that strength of the pre-fired electrode layer remarkably declines. Also, it is preferable to add a plasticizer and/or adhesive agent to the electrode paste so as to improve adhesiveness and/or adherence of the electrode paste.

Then, by using the electrode paste, an electrode layer 12a is formed to be in a predetermined pattern on a surface of the carrier sheet 20 as a first support sheet. As a method of forming the electrode layer, for example, a thick film formation method, such as a printing method using electrode paste, or a thin film formation method, such as a vapor deposition method and sputtering, may be mentioned. In the present embodiment, the electrode layer 12a is formed by a screen printing method as one kind of thick film formation methods or a gravure printing method. A thickness of the electrode layer 12a is preferably 1.5 µm or thinner.

As the carrier sheet 20, for example, a PET film, etc. are mentioned and those coated with a silicon resin, etc. are preferable for improving the releasability. A thickness of the carrier sheet 20 is not particularly limited but 5 to 100 µm is preferable.

As shown in FIG. 2A, after or before forming an electrode paste layer in a predetermined pattern on the surface of the carrier sheet 20 by a printing method, a blank pattern layer 24 having substantially the same thickness as that of the electrode layer 12a is formed on a surface of the carrier sheet 20, where the electrode layer 12a is not formed. The blank pattern layer 24 is formed by the same material as a later explained green sheet 10a. Also, the blank pattern layer 24 may be formed by the same method as in the electrode layer 12a or the later explained green sheet 10a. The electrode layer 12a and the blank pattern layer 24 are dried in accordance with need. The drying temperature is not particularly limited but 70 to 120° C. is preferable and the drying time is preferably 5 to 15 minutes.

Next, as shown in FIG. 2B, a green sheet 10a is formed on the surface of the electrode layer 12a and the blank pattern layer 24 formed on the carrier sheet 20. The green sheet 10a is to compose the dielectric layer 10 shown in FIG. 1 after firing. Note that, in the present embodiment, an adhesive layer is not used to form the green sheet 10a on the surface of the electrode layer 12 and the blank pattern layer 24. By forming the green sheet 10a on the electrode layer 12a and the blank pattern layer 24 without using an adhesive layer, an adhesive force in stacking can be maintained high, the production steps can be simplified and the production costs can be reduced.

The green sheet 10a is formed on the surface of the electrode layer 12a and the blank pattern layer 24 by using dielectric paste including a dielectric material by a die coating method, etc. The green sheet 10a is preferably formed to have a thickness of 0.5 to 30 µm, and more preferably 0.5 to 10 µm and dried after being formed on the electrode layer 12a and the blank pattern layer 24. The drying temperature of the green sheet 10a is preferably 50 to 100° C. and the drying time is preferably 1 to 20 minutes. A thickness of the green sheet 10a after drying is contracted to 5 to 25% of a thickness before drying. A thickness of the dried green sheet is preferably 1.5 µm or thinner and, furthermore, a total thickness of the green sheet 10a and the electrode layer 12a is preferably 3.0 µm or thinner.

The dielectric paste for producing the green sheet 10a is normally composed of organic solvent based paste obtained by kneading a dielectric material and an organic vehicle or of water based paste.

The dielectric material may be suitably selected from variety of compounds to be composite oxides or oxides, for example, carbonates, nitrites, hydroxides and organic metal compounds, etc. and mixed for use. The dielectric material is normally used as a powder having an average particle diameter of 0.3 µm or smaller, more preferably 0.2 µm or smaller. Note that, to form an extremely thin green sheet, it is preferable to use a finer powder than a thickness of the green sheet.

An organic vehicle is obtained by dissolving a binder in an organic solvent. The binder to be used for the organic vehicle is not particularly limited and a variety of normal binders, such as ethyl cellulose, polyvinyl butyral and an acrylic resin, are used. Preferably, an acrylic resin, polyvinyl butyral or other butyral based resin is used.

Also, the organic solvent to be used for the organic vehicle is not particularly limited and an organic solvent, such as terpineol, alcohol, butyl carbitol, acetone, methylethyl ketone (MEK), toluene, xylene, ethyl acetate, butyl stearate and isobornyl acetate, is used. A vehicle in a water based paste is obtained by dissolving a water-soluble binder in water. The water-soluble binder is not particularly limited and polyvinyl alcohol, methyl cellulose, hydroxyl ethyl cellulose, water-soluble acrylic resin and emulsion, etc. may be used. A content of each component in the dielectric paste is not particularly limited and may be a normal content, for example, about 1 to 5 wt % of a binder and about 10 to 50 wt % of a solvent (or water).

The dielectric paste may contain additives selected from a variety of dispersants, plasticizers, dielectrics, glass frits, insulators and antistatic agents, etc. in accordance with need. Note that a total content of them is preferably 10 wt % or smaller. As a plasticizer, dioctyl phthalate, benzilbutyl phthalate and other phthalate ester, adipic acid, phosphate ester and glycols, etc. may be mentioned. When using a butyral based resin as the binder resin, it is preferable that a content of a plasticizer is 25 to 100 parts by weight with respect to 100 parts by weight of the binder resin. When the plasticizer is too small, the green sheet tends to become fragile, while when too large, the plasticizer exudes and the handleability becomes poor.

Figure 3A:
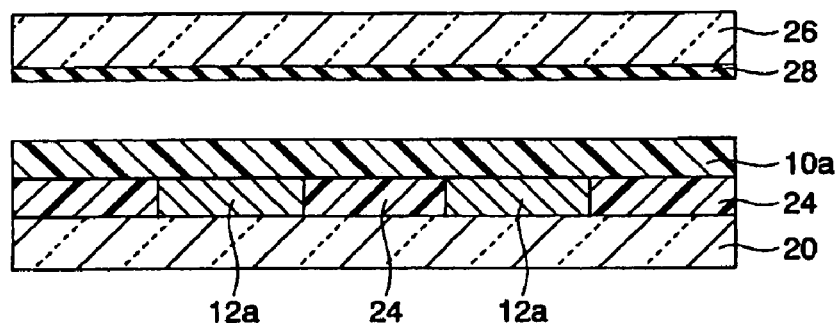
FIG. 3A is a sectional view of a key part showing a formation method of an adhesive layer according to an embodiment of the present invention.

Being separate from the above carrier sheet 20, as shown in FIG. 3A, an adhesive layer transfer sheet obtained by forming an adhesive layer 28 on a surface of a carrier sheet 26 is prepared as a second support sheet. The carrier sheet 26 is formed by the same sheet as the carrier sheet 20. Note that a thickness of the carrier sheet 26 may be the same as or different from that of the carrier sheet 20.

The adhesive layer 28 includes a binder and a plasticizer. The adhesive layer 28 may include the same dielectric particles as the dielectric composing the green sheet 10a, but when forming an adhesive layer having a thinner thickness than a particle diameter of the dielectric particles, the dielectric particles should not be included. Also, when the dielectric particles are included in the adhesive layer 28, a particle diameter of the dielectric particles is preferably smaller than a particle diameter of the dielectric particles included in the green sheet.

The binder for the adhesive layer 28 is, for example, an acrylic resin, polyvinyl butyral and other butyral based resin, polyvinyl acetal, polyvinyl alcohol, polyolefin, polyurethane, polystyrene, or is formed by organics composed of a copolymer of these, or emulsion. In the present embodiment, it is particularly preferable to use an acrylic resin or a butyral based resin, such as polyvinyl butyral, as the binder. Also, the binder to be included in the adhesive layer 28 may be the same as or different from the binder included in the green sheet 10a, but the same binder is preferable.

The plasticizer for the adhesive layer 28 is not particularly limited and, for example, dioctyl phthalate, bis(2-ethylhexyl) phthalate and other phthalate ester, adipic acid, phosphate ester and glycols, etc. may be mentioned. The plasticizer to be included in the adhesive layer 28 may be the same as or different from the plasticizer included in the green sheet 10a.

The plasticizer is preferably included in an amount of 0 to 200 parts by weight, more preferably 20 to 200 parts by weight, and particularly preferably 30 to 70 parts by weight with respect to 100 parts by weight of the binder in the adhesive layer 28.

The adhesive layer 28 preferably furthermore includes an antistatic agent. The antistatic agent preferably includes one of imidazoline based surfactants, and an adding quantity of the antistatic agent based on weight is not larger than an adding amount of the binder (an organic polymer material) based on the weight. A content of the antistatic agent is preferably 0 to 200 parts by weight, more preferably 20 to 200 parts by weight, and particularly preferably 50 to 100 parts by weight with respect to 100 parts by weight of a binder in the adhesive layer 28.

A thickness of the adhesive layer 28 is preferably 0.02 to 0.3 μm, more preferably, 0.05 to 0.1 μm and, moreover, it is thinner than an average particle diameter of the dielectric particles included in the green sheet. Also, a thickness of the adhesive layer 28 is preferably 1/10 of a thickness of the green sheet 10a or thinner.

When the thickness of the adhesive layer 28 is too thin, an adhesive force declines, while when too thick, a clearance easily arise inside the element body after sintering due to the thickness of the adhesive layer, and the capacitance tends to decline remarkably for that volume.

The adhesive layer 28 is formed on the surface of the carrier sheet 26 as the second support sheet, for example, by the bar coater method, die coater method, reverse coater method, dip coater method and kiss coater method, etc. and dried if necessary. The drying temperature is not particularly limited but is preferably the room temperature to 80° C. and the drying time is preferably 1 to 5 minutes.

Figure 3B:
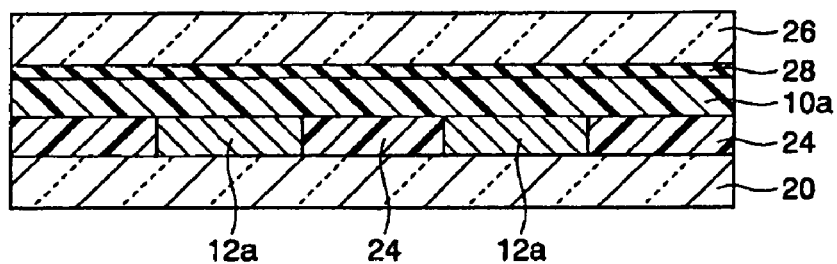
FIG. 3B is a sectional view of a key part showing a step continued from FIG. 3A.
Figure 3C:
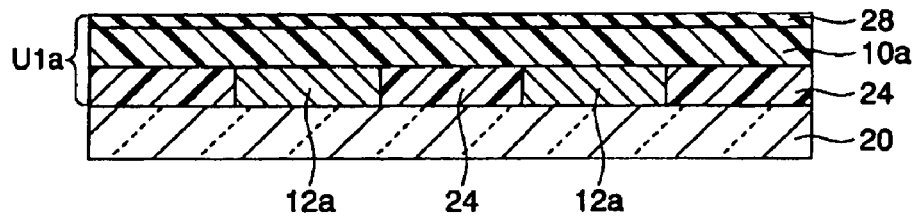
FIG. 3C is a sectional view of a key part showing a step continued from FIG. 3B.

Next, on the surface of the green sheet 10a formed on the electrode layer 12a and the blank pattern layer 24 shown in FIG. 2B, an adhesive layer 28 is formed, so that a multilayer unit U1a shown in FIG. 3C is obtained. Namely, as shown in FIG. 3A and FIG. 3B, the adhesive layer 28 of the carrier sheet 26 is pressed against the surface of the green sheet 10a, the result is heated and pressured, then, by releasing the carrier sheet 26, as shown in FIG. 3C, the adhesive layer 28 is transferred to the surface of the green sheet 10a, so that the multilayer unit U1a is obtained.

By forming the adhesive layer 28 by the transfer method, soaking of components of the adhesive layer to the green sheet 10a or the electrode layer 12a and blank pattern layer 24 can be effectively prevented. Therefore, an adverse effect is not given to a composition of the green sheet 10a or the electrode layer 12a and blank pattern layer 24. Furthermore, even when the adhesive layer 28 is formed to be thin, components of the adhesive layer do not soak into the green sheet 10a or the electrode layer 12a and blank pattern layer 24, so that the high adhesiveness can be maintained.

A heating temperature at transferring is preferably 40 to 100° C., and a pressuring force is preferably 0.2 to 15 MPa. The pressure may be applied by a press or calendar roll, but pressure by a pair of rolls is preferable.

Next, by stacking a plurality of the multilayer units, wherein the electrode layer 12a and blank pattern layer 24, the green sheet 10a, and the adhesive layer 28 are stacked in this order, a green chip is formed. Stacking of the multilayer units is, as shown in FIG. 4A, FIG. 4B, FIG. 5A and FIG. 5B, attained by bonding the multilayer units via the adhesive layer 2B.

Below, the stacking method will be explained.

Figure 4A:
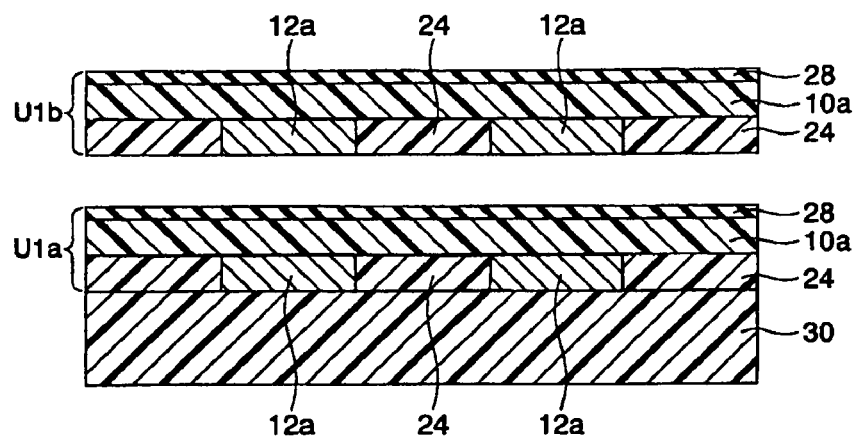
FIG. 4A is a sectional view of a key part showing a staking method of a green sheet having an electrode layer according to an embodiment of the present invention.
Figure 4B:
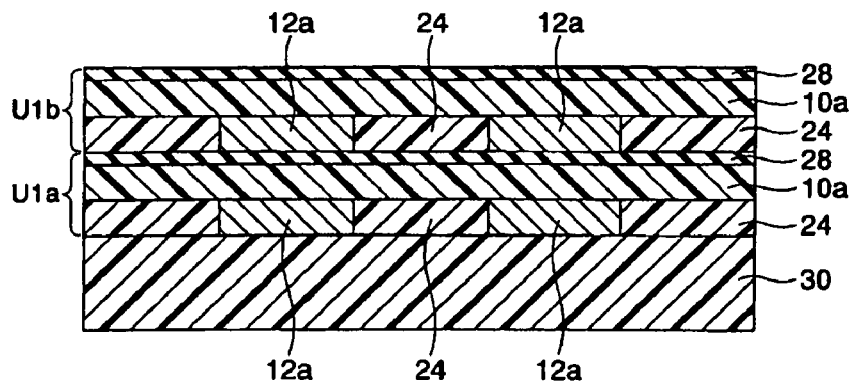
FIG. 4B is a sectional view of a key part showing a step continued from FIG. 4A.

First, as shown in FIG. 4A, the first support sheet 20 is released from the multilayer unit U1a produced as above and stacked on a green sheet 30 as an outer layer (a multilayer body having a thickness of 100 to 200 μm obtained by stacking a plurality of green sheets having a thickness of 10 to 30 μm and not having an electrode layer formed thereon). Next, another multilayer unit U1b produced by the same method as the multilayer unit U1a is prepared. The first support sheet 20 is released from the prepared multilayer unit U1b to obtain a multilayer unit U1b without the first support sheet 20. Then, as shown in FIG. 4B, the multilayer unit U1b without the first support sheet and the multilayer unit U1a are stacked via the adhesive layer 28 of the multilayer unit U1a and bonded.

Figure 5A:
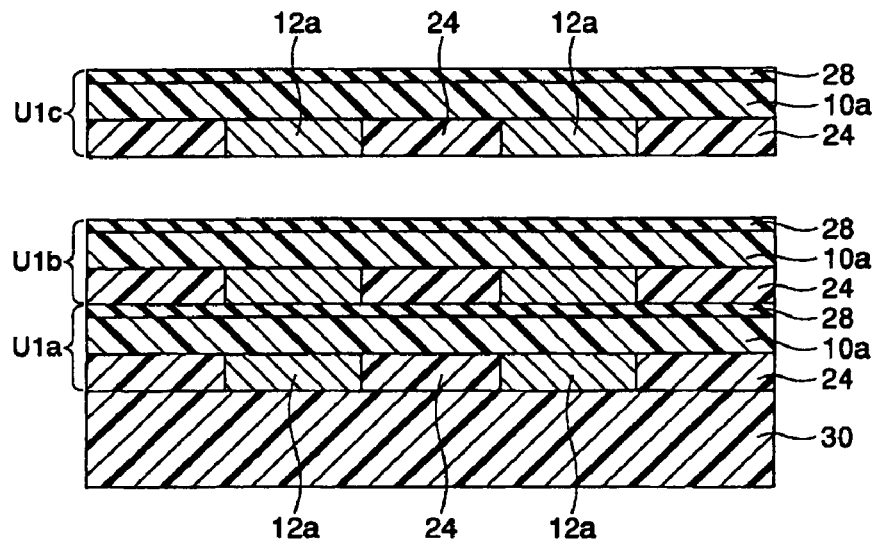
FIG. 5A is a sectional view of a key part showing a step continued from FIG. 4B.
Figure 5B:
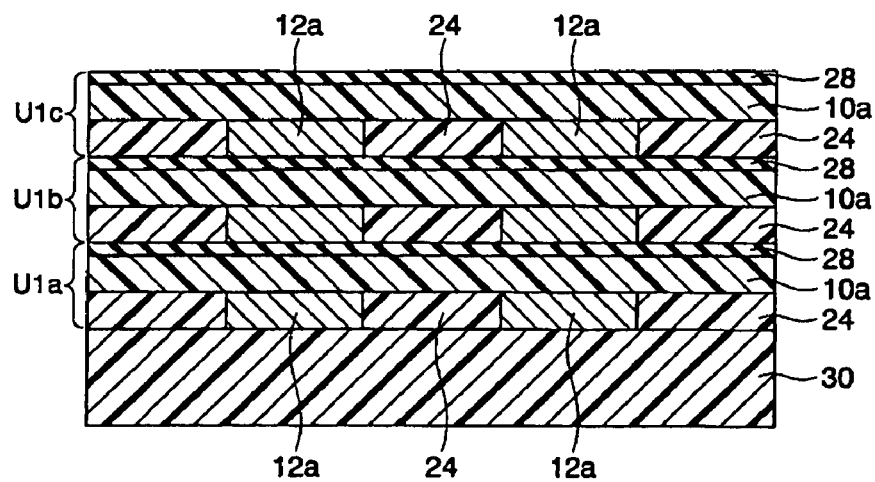
FIG. 5B is a sectional view of a key part showing a step continued from FIG. 5A.

Next, as shown in FIG. 5A and FIG. 5B, in the same way, another multilayer unit U1c is stacked on the multilayer unit U1b via the adhesive layer 28 of the multilayer unit U1b and bonded. Then, by repeating the steps shown in FIG. 5A and FIG. 5B, a plurality of multilayer units are stacked. Next, on top of the multilayer body, the green sheet 30 as an outer layer is stacked, a final pressure is applied and, then, the multilayer body is cut into a predetermined size to form a green chip. Note that a pressure at the final pressuring is preferably 10 to 200 MPa, and the heating temperature is preferably 40 to 100° C.

The green chip is subjected to binder removal processing, firing processing and thermal treatment for re-oxidizing the dielectric layers.

The binder removal processing may be performed under a normal condition, but when using a base metal, such as Ni and a Ni alloy, as a conductive material of the internal electrode layers, the condition below is particularly preferable.

Temperature raising rate: 5 to 300° C./hour, particularly 10 to 50° C./hour

Holding temperature: 200 to 400° C., particularly 250 to 350° C.

Holding time: 0.5 to 20 hours, particularly 1 to 10 hours

Atmosphere gas: wet mixed gas of $N_2$ and $H_2$

The firing conditions are preferably as below.

Temperature raising rate: 50 to 500° C./hour, particularly 200 to 300° C./hour

Holding temperature: 1100 to 1300° C., particularly 1150 to 1250° C.

Holding time: 0.5 to 8 hours, particularly 1 to 3 hours

Cooling rate: 50 to 500° C./hour, particularly 200 to 300° C./hour

Atmosphere gas: wet mixed gas of $N_2+H_2$, etc.

Note that an oxygen partial pressure of an air atmosphere at firing is preferably $10^{-2}$ Pa or lower, and particularly $10^{-2}$ to $10^{-8}$ Pa. When exceeding the range, the internal electrode layers tend to be oxidized, while when the oxygen partial pressure is too low, it is liable that abnormal sintering is caused in electrode materials of the internal electrode layers to result in breaking.

The thermal processing after the firing as above is preferably performed with a holding temperature or highest temperature of preferably 1000° C. or higher, more preferably 1000 to 1100° C. When the holding temperature or highest temperature at the thermal processing is lower than the above range, oxidization of the dielectric material becomes insufficient and the insulation resistance lifetime tends to become short, while when exceeding the above range, Ni of the internal electrodes is oxidized and not only declining the capacity but it reacts with the dielectric base material and the lifetime tends to become short. A partial oxygen pressure at the thermal processing is higher than that of the reducing atmosphere at firing and is preferably $10^{-3}$ Pa to 1 Pa, and more preferably $10^{-2}$ Pa to 1 Pa. When it is lower than the above range, re-oxidization of the dielectric layers becomes difficult, while when exceeding the range, the internal electrode layers 12 tend to be oxidized.

Other conditions of the thermal treatment are preferably as below.

Holding time: 0 to 6 hours, particularly 2 to 5 hours

Cooling rate: 50 to 500° C./hour, particularly 100 to 300° C./hour

Atmosphere gas: wet $N_2$ gas, etc.

Note that to wet the $N_2$ gas and mixed gas, etc., for example, a device for making a gas flow through heated water to generate bubbles may be used. In that case, the water temperature is preferably 0 to 75° C. or so. The binder removal processing, firing and annealing may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the annealing. On the other hand, when performing them separately, at the time of firing, after raising the temperature to the holding temperature of the binder removal processing in an atmosphere of a nitrogen gas or a wet nitrogen gas, the atmosphere is changed, and the temperature is preferably furthermore raised. After that, after cooling the temperature to the holding temperature of the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the annealing may be in a wet $N_2$ gas atmosphere.

End surface polishing, for example, by barrel polishing or sand blast, etc. is performed on the sintered body (element body 4) obtained as above, and the external electrode paste is burnt to form external electrodes 6 and 8. A firing condition of the external electrode paste is preferably, for example, at 600 to 800° C. in a wet mixed gas of $N_2$ and $H_2$ for 10 minutes to 1 hour or so. A pad layer is formed by plating, etc. on the surface of the external electrodes 6 and 8 if necessary. Note that the terminal electrode paste may be fabricated in the same way as the electrode paste explained above.

A multilayer ceramic capacitor of the present invention produced as above is mounted on a print substrate, etc. by soldering, etc. and used for a variety of electronic apparatuses, etc.

In the present embodiment, in a step where nonadhesion defects (nonlamination) do not become disadvantageous relatively, stacking is performed without using an adhesive layer. While, in a step where nonadhesion defects (nonlamination) easily arise, stacking is performed via the adhesive layers. Namely, an adhesive layer is not used when forming the green sheet 10a on an electrode layer 12a, so that the production steps can be simplified and the production costs can be reduced. Furthermore, when stacking the green sheets 10a having an electrode layer 12a, adhesive layers 28 are used for stacking, so that adhesiveness can be improved and nonadhesion defects (nonlamination) can be reduced. Therefore, according to the production method of the present embodiment, even when the green sheets are formed to be extremely thin, adhesiveness can be maintained high, nonadhesion defects (nonlamination) can be reduced, production steps can be simplified and the production costs can be reduced.

Furthermore, in the present embodiment, by forming the electrode layer 12a and the blank pattern layer 24 on the carrier sheet 20 first, then, forming the green sheet 10a thereon, the green sheet 10a having the electrode layer 12a and the blank pattern layer 24 is formed. Therefore, soaking of a solvent included in the slurry to the green sheet (sheet attack) can be effectively prevented, and the short-circuiting defect rate can be lowered. Also, because soaking of a solvent can be prevented, a composition of the electrode layer or green sheet is not adversely affected.

Note that the present invention is not limited to the above embodiment and may be variously modified within the scope of the present invention.

For example, the method of the present invention is not limited to the production method of a multilayer ceramic capacitor and may be applied as a production method of other multilayer electronic devices.

Also, in the above embodiment, the adhesive layer 28 was formed by the transfer method, but it may be formed by applying directly to the green sheet 10a, for example, by a die coating method, etc.

Also, in the above embodiment, the first support sheet 20 is released from the multilayer unit before stacking each multilayer unit, however, a step of releasing the first support sheet 20 may be performed after stacking the multilayer unit, for example, as shown in FIG. 6A to FIG. 6C and FIG. 7A to FIG. 7C.

Figure 6A:
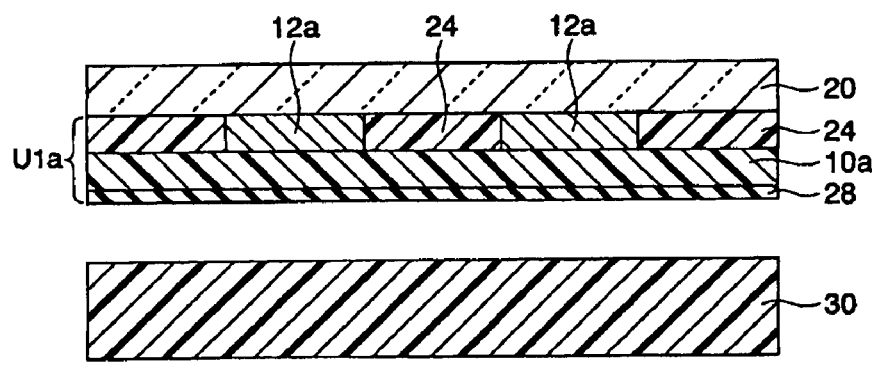
FIG. 6A is a sectional view of a key part showing a stacking method of green sheets having an electrode layer according to another embodiment of the present invention.
Figure 6B:
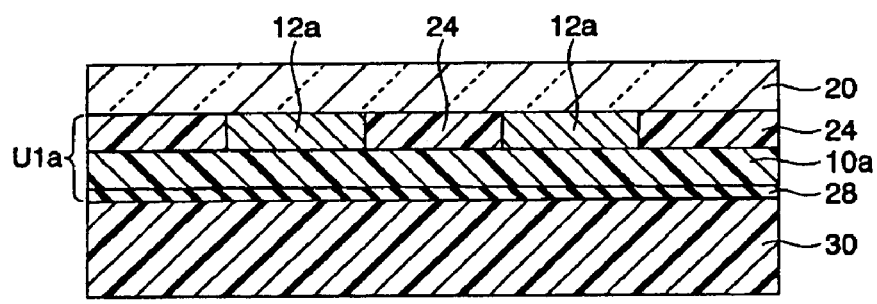
FIG. 6B is a sectional view of a key part showing a step continued from FIG. 6A.
Figure 6C:
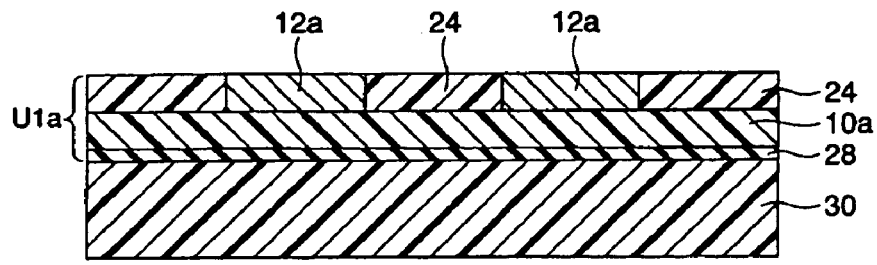
FIG. 6C is a sectional view of a key part showing a step continued from FIG. 6B.

Namely, as shown in FIG. 6A and FIG. 63, first, a multilayer unit U1a before releasing the first support sheet 20 therefrom is bonded to be stacked on the green sheet 30 as an outer layer via an adhesive layer 28. Next, as shown in FIG. 6C, the first support sheet 20 is released from the multilayer unit U1a.

Figure 7A:
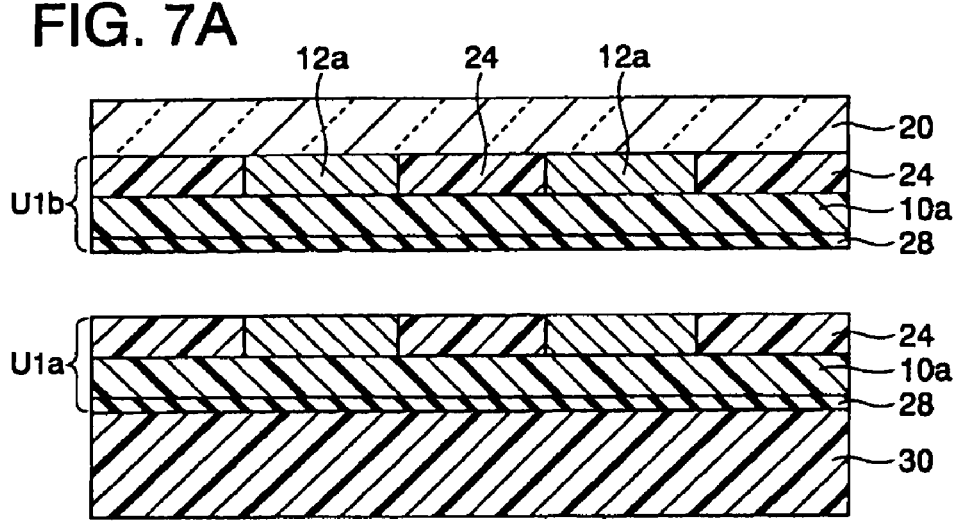
FIG. 7A is a sectional view of a key part showing a step continued from FIG. 6C.
Figure 7B:
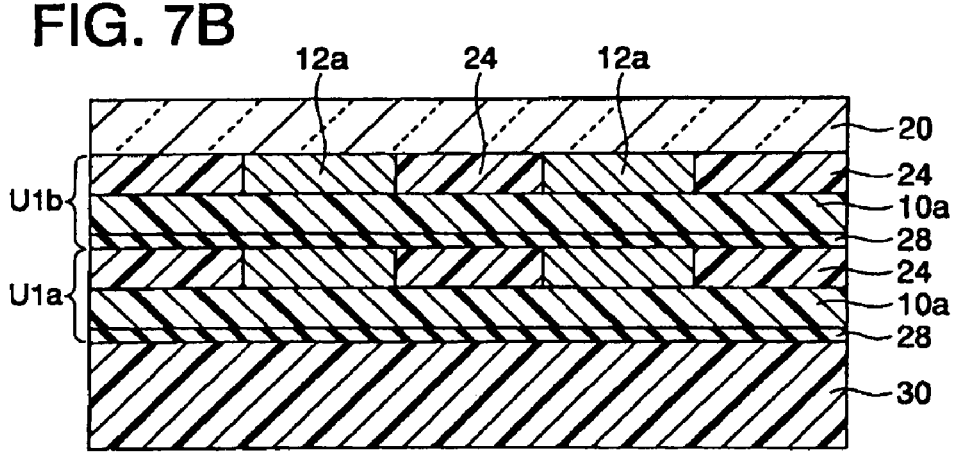
FIG. 7B is a sectional view of a key part showing a step continued from FIG. 7A.
Figure 7C:
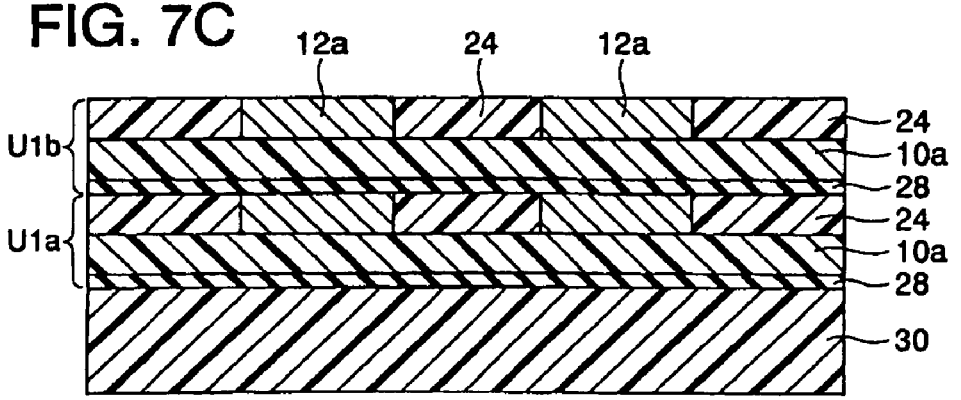
FIG. 7C is a sectional view of a key part showing a step continued from FIG. 7B.

Next, as shown in FIG. 7A to FIG. 7C, in the same way, another multilayer unit U1b is bonded to be stacked on the multilayer unit U1a via an adhesive layer 28 of the multilayer unit U1b. Then, by repeating the steps shown in FIG. 7A to FIG. 7C, a plurality of multilayer units are stacked. Finally, on top of the multilayer body, a green sheet as an outer layer is stacked, final pressure is applied, then, the multilayer body is cut into a predetermined size to form a green chip.

EXAMPLES

Below, the present invention will be explained based on furthermore detailed examples, but the present invention is not limited to these examples.

Example 1

First, each paste below was prepared.
Green Sheet Paste

First, as additive (subcomponent) materials, $(Ba, Ca)SiO_3$ in an amount of 1.48 parts by weight, $Y_2O_3$ in 1.01 parts by weight, $MgCO_3$ in 0.72 part by weight, $MnO$ in 0.13 part by weight and $V_2O_5$ in 0.045 part by weight were prepared. Then, these prepared additive (subcomponent) materials were mixed to obtain an additive (subcomponent) material mixture.

Next, the thus obtained additive material mixture in an amount of 4.3 parts by weight, ethanol in 3.11 parts by weight, propanol in 3.11 parts by weight, xylene in 1.11 parts by weight and a dispersant in 0.04 part by weight were mixed and pulverized by using a ball mill, so that additive slurry was obtained. The mixing and pulverizing was performed under a condition of using a 250 cc polyethylene resin container and adding 2 mm$\phi$ $ZrO_2$ media in an amount of 450 g at rotation rate of 45 m/minute and for 16 hours. Note that a particle diameter of the additive material after pulverizing was 0.1 μm in a median size.

Next, the additive slurry obtained as above in an amount of 11.65 parts by weight, $BaTiO_3$ powder (BT-02 made by Sakai Chemical Industry Co., Ltd.) in 100 parts by weight, ethanol in 35.32 parts by weight, propanol in 35.32 parts by weight, xylene in 16.32 parts by weight, dioctyl phthalate (plasticizer) in 2.61 parts by weight, mineral spirit in 7.3 parts by weight, a dispersant in 2.36 parts by weight, antistatic agent in 0.42 part by weight, an organic vehicle in 33.74 parts by weight, MEK in 43.81 parts by weight and 2-butoxyethanol in 43.81 parts by weight were mixed by using a ball mill to obtain green sheet paste. Note that mixing by a ball mill was performed under the condition of using a 500 cc polyethylene resin container and adding 2 mmφ ZrO$_2$ media in an amount of 900 g at rotation rate of 45 m/minute for 20 hours. Also, the organic vehicle was produced by mixing to dissolve a polyvinyl butyral resin (made by Sekisui Chemical Co., Ltd.) having a polymerization degree of 1450 and a butyralation degree of 69% in an amount of 15 parts by weight in ethanol in an amount of 42.5 parts by weight and propanol in an amount of 42.5 parts by weight at 50° C. Namely, a resin content (an amount of the polyvinyl butyral resin) in the organic vehicle was 15 wt %.

Internal Electrode Paste

First, an additive material mixture was produced in the same way as that in the green sheet paste.

Next, the additive material mixture obtained as above in an amount of 100 parts by weight, acetone in 150 parts by weight, terpineol in 104.3 parts by weight, a polyethylene glycol based dispersant in 1.5 parts by weight were mixed to obtain slurry, and the obtained slurry was pulverized by a pulverizer (model LMZ0.6 made by Ashizawa Finetech Ltd.) to obtain additive slurry.

Note that pulverization of additives in the slurry was performed by rotating a rotor at a rotation rate of 14 m/minute and circulating the slurry between a vessel and a slurry tank. Note that ZrO$_2$ beads having a diameter of 0.1 mm were filled in the vessel in an amount of 80% of the vessel capacity, and pulverization was performed, and retention time of the entire slurry in the vessel was 5 minutes. Note that a median diameter of the additives after the pulverization was 0.1 µm.

Next, an evaporator was used to remove by evaporating acetone from the additive slurry after pulverization so as to fabricate additive slurry dispersed with the additive material in terpineol. Note that additive material concentration in the additive slurry after removing acetone was 49.3 wt %.

Next, a nickel powder (having a particle diameter of 0.2 µm made by Kawatetsu Industrial Co., Ltd.) in an amount of 100 parts by weight, the additive slurry in 1.77 parts by weight, a BaTiO$_3$ powder (having a particle diameter of 0.05 µm made by Sakai Chemical Industry Co., Ltd.) in 19.14 parts by weight, organic vehicle in 56.25 parts by weight, polyethylene glycol based dispersant in 1.19 parts by weight, dioctyl phthalate (plasticizer) in 2.25 parts by weight, isobornyl acetate in 32.19 parts by weight and acetone in 56 parts by weight were mixed by using a ball mill to form paste. Next, a mixer having an evaporator and heating mechanism was used to remove by evaporating acetone from the obtained paste, so that internal electrode paste was obtained.

Note that mixing by a ball mill was performed under the condition of filling 2 mmφ ZrO$_2$ media in an amount of 30 volume % and a mixture of the above materials in an amount of 60 volume % in the ball mill at a rotation rate of 45 m/minute for 16 hours. Also, the organic vehicle was produced by mixing to dissolve an ethyl cellulose resin having molecular weight of 130000 in an amount of 4 parts by weight and an ethyl cellulose resin having molecular weight of 230000 in an amount of 4 parts by weight in isobornyl acetate in an amount of 92 parts by weight at 70° C. Namely, a resin content (an amount of ethyl cellulose resin) in the organic vehicle was 8 wt %.

Next, viscosity $V_8$ at a shearing rate of 8 sec$^{-1}$ and viscosity $V_{50}$ at 50 sec$^{-1}$ of thus obtained internal electrode paste were measured by using a cone-plate viscosimeter (made by HAAKE) at 25° C., respectively. Measurement results were $V_8$=15.5 cps, $V_{50}$=8.5 cps and $V_8/V_{50}$=1.72, and they were confirmed to be viscosity preferably used in the printing method.

Blank Pattern Paste

First, in the same way as in the internal electrode paste, additive slurry, wherein additive materials are dispersed in terpineol, was fabricated.

Next, the additive slurry in an amount of 8.87 parts by weight, a BaTiO$_3$ powder (BT-02 made by Sakai Chemical Industry Co., Ltd.) in 95.70 parts by weight, an organic vehicle in 104.36 parts by weight, a polyethylene glycol based dispersant in 1.0 part by weight, dioctyl phthalate (plasticizer) in 2.61 parts by weight, isobornyl acetate in 19.60 parts by weight, acetone in 57.20 parts by weight and imidazoline based surfactant (antistatic agent) in 0.4 part by weight were mixed by using a ball mill to form paste. Then, a mixer having an evaporator and heating mechanism was used to remove acetone by evaporation from the obtained paste, so that blank pattern paste was obtained. Note that the same organic vehicle as that in the internal electrode paste was used as the above organic vehicle. Namely, 8 wt % isobornyl acetate solution of an ethyl cellulose resin was used.

Next, in the same way as in the internal electrode paste, viscosity of the obtained blank pattern paste was measured. Measurement results were $V_8$=19.9 cps, $V_{50}$=10.6 cps and $V_8/V_{50}$=1.88, and they were confirmed to be viscosity preferably used in the printing method.

Adhesive Layer Paste

By mixing to dissolve a butyral resin (BM-SH having a polymerization degree of 800 and butyralation degree of 83% made by Sekisui Chemical Industry Co., Ltd.) in an amount of 1.5 parts by weight, MEK in an amount of 98.5 parts by weight, DOP (a mixed solvent of dioctyl phthalate and bis(2-ethylhexyl) phthalate) in an amount of 50 parts by weight, adhesive layer paste was produced.

Formation of Internal Electrode Layer, Blank Pattern and Green Sheet,

First, the above internal electrode paste was printed on a PET film (first support sheet), a surface thereof is subjected to releasing treatment with a silicone based resin, by a screen printing machine. Then, by drying at 90° C. for 5 minutes, an internal electrode layer having a predetermined pattern was formed. The internal electrode layer was formed to have a film thickness of 1 µm after drying.

Next, the blank pattern paste was printed by a screen printing machine on a part of the PET film where an internal electrode layer is not formed and, then, dried at 90° C. for 5 minutes, so that a blank pattern was formed. When printing the blank pattern, a screen plate making in a pattern complementary to the pattern used for printing the internal electrode paste were used. The blank pattern was formed to have the same film thickness as that of the internal electrode layer when dried.

Next, on the internal electrode layer and blank pattern formed as above, the green sheet paste explained above was applied by a die coater and dried to form a green sheet. The applying speed was 50 m/minute, and drying was performed in a drying furnace at 80° C. The green sheet was formed to have a film thickness of 1 µm after drying.

Formation and Transfer of Adhesive Layer

First, adhesive layer paste was applied to another PET film (second support sheet) by a die coater and dried to form an adhesive layer. The applying speed was 70 m/minute, and a temperature in a drying furnace was 80° C. when drying. The adhesive layer was formed to have a film thickness of 0.1 µm when dried. Note that the PET film used as the second support sheet was a PET film subjected to releasing treatment with a silicone based resin on its surface.

Next, on the green sheet 10a having the electrode layer 12a and blank pattern 24 produced as above, the adhesive layer 28 was transferred by the method shown in FIG. 3A to FIG. 3C to form a multilayer unit U1a. At transferring, a pair of rolls were used, the pressure force was 5 MPa and the temperature was 100° C. It was confirmed that the transfer was performed preferably.

Production of Green Chip

First, a plurality of outer layer green sheets each formed to have a thickness of 10 μm were stacked to reach a thickness of about 50 μm, and an outer layer, which becomes a cap portion (a cover layer) of a multilayer capacitor after firing, was formed. Stacking was performed under a condition with a press pressure of 200 MPa at a press temperature of 50° C. Note that the green sheet slurry produced as above was used as the outer layer green sheets, and the green sheet was formed to have a thickness of 10 μm after being dried.

Then, 100 of multilayer units were stacked thereon by the method shown in FIG. 4A, FIG. 4B, FIG. 5A and FIG. 5B. Further thereon, a plurality of outer layer green sheets each formed to have a thickness of 10 μm were stacked to reach a stacked thickness of about 50 μm and an outer layer to be a cap portion (cover layer) of a multilayer capacitor after firing was formed. Next, the obtained multilayer body was press molded under a condition of 100 MPa at 70° C. and, then, cut by a dicing processor, so that a pre-fired green chip was obtained. Note that, in the present embodiment, a nonadhesion defect (nonlamination) rate of the pre-fired green chip was measured by a later explained method.

Production of Sintered Body

Then, the final multilayer body was cut into a predetermined size, subjected to binder removal processing, firing and annealing (thermal treatment) and a chip-shaped sintered body was produced.

The binder removal processing was performed as below.
Temperature raising rate: 50° C./hour
Holding temperature: 240° C.
Holding time: 8 hours
Atmosphere gas: in the air The firing was performed as below.
Temperature raising rate: 300° C./hour
Holding temperature: 1200° C.
Holding time: 2 hours
Cooling rate: 300° C./hour
Atmosphere gas: mixed gas of $N_2+H_2$ (5%) controlled to be a dew point of 20° C.

The annealing (re-oxidization) was performed as below.
Temperature holding time: 3 hours
Cooling rate: 300° C./hour
Atmosphere gas: $N_2$ gas controlled to be a dew point of 20° C.

Note that a wetter with a water temperature of 0 to 75° C. was used to wet the atmosphere gases.

Next, end surfaces of the chip-shaped sintered body was polished by sand blast, then, In—Ga alloy paste was applied to the end surfaces to form external electrodes, so that a multilayer capacitor sample having the configuration shown in FIG. 1 was obtained.

Measurement of Nonadhesion Defect (Nonlamination) Rate

An arising degree of nonadhesion defects (nonlamination) was measured on the thus obtained pre-fired green chip samples. The measurement was made by burying 50 of the green chip samples in two-part curing epoxy resin, so that sides of the dielectric layers and internal electrode layers expose and, then, curing the two-part epoxy resin. Then, the green chip samples buried in the epoxy resin were polished to a depth of 1.6 mm by using sand papers. Note that polishing by sand papers was performed by using #400 sand paper, #800 sand paper, #1000 sand paper and #2000 sand paper in this order. Next, mirror finish processing was performed by using diamond paste on the surface polished by the sand papers. Then, an optical microscope with a magnification of 400 times was used to observe the polished surface after the mirror finish processing to check an existence of nonadhesion defect. Based on the result of observation by the optical microscope, a rate of samples with nonadhesion defects to all measured samples was used as the nonadhesion defect rate. The results are shown in Table 1.

Measurement of Short-Circuiting Defect Rate

The short-circuiting defect rate was measured by preparing 50 capacitor samples and counting samples with short-circuiting.

Specifically, an insulation-resistance tester (E2377A Multi-meter made by Hewlett Packard) was used to measure resistance values. Samples having a resistance value of 100 kΩ or lower were determined as short-circuiting samples, and a rate of the short-circuiting samples to all measured samples was considered as the short-circuiting defect rate. The results are shown in Table 1.

Example 2

Other than using a coating method for forming an adhesive layer instead of the transfer method, pre-fired green chips and multilayer ceramic capacitor samples were produced in the same way as in the example 1, and the nonadhesion defect rate and short-circuiting defect rate were measured in the same way as in the example 1.

Namely, in the example 2, the adhesive layer paste was directly applied to the surface on opposite side of the electrode layer side of the green sheet 10a having the electrode layer 12a and blank pattern 24 by using a die coater so as to form an adhesive layer.

Comparative Example 1

Other than forming the adhesive layer, pre-fired green chips and multilayer ceramic capacitor samples were produced in the same way as in the example 1, and the nonadhesion defect rate and short-circuiting defect rate were measured in the same way as in the example 1.

Namely, in the comparative example 1, multilayer units were stacked without any adhesive layers.

TABLE 1

|  | Formation Method of Adhesive Layer | Nonadhesive Defect Rate [%] | Short-Circuiting Defect Rate [%] |
| --- | --- | --- | --- |
| Example 1 | Transfer Method | 0 | 12 |
| Exampfe 2 | Coating Method | 0 | 50 |
| Comparative Example 1 | Not Formed | 100 | Unmeasureable |

Evaluation 1

Table 1 shows nonadhesion defect rates and short-circuiting defect rates of the examples 1 and 2 and comparative example 1 were shown, respectively.

From Table 1, in the example 1 and example 2, wherein an adhesive layer was formed on the green sheet having an electrode layer, and multilayer units were stacked via adhesive layers, the nonadhesion defect rates were all 0%, which were preferable results. Also, in the example 1, the short-circuiting defect rate was 12%, which was better result comparing with the example 2. It is considered because soaking (sheet attack) of the adhesive layer to the electrode layer or green sheet could be effectively prevented at the time of forming the adhesive layer in the example 1.

On the other hand, in the comparative example 1, wherein the multilayer units were stacked without forming any adhesive layers, the nonadhesion defect rate was 100%. Namely, a sufficient adhering force could not be obtained in stacking and all samples resulted in arising nonadhesion defects. Note that, in the comparative example 1, nonadhesion defects arose in all samples, so that the short-circuiting defect rate could not be measured.

From the results, it was confirmed that by forming an adhesive layer on the green sheet having an electrode layer and stacking the green sheets each having an electrode layer via the adhesive layer, a stacking property (adhesiveness in stacking) can be improved, nonadhesion defects and adhesion defects can be prevented, and a short-circuiting defect rate can be lowered. It was also confirmed that the short-circuiting defect rate can be furthermore lowered by forming the adhesive layer by a transfer method.

Example 3

Other than using an acrylic resin as a binder for the green sheet instead of a polyvinyl butyral resin, green chips and multilayer ceramic capacitor samples were produced in the same way as in the example 1, and the nonadhesion defect rate and short-circuiting defect rate were measured in the same way as in the example 1.

Namely, in the example 3, acrylic resin green sheet paste produced by the method below was used as green sheet paste.

Acrylic Resin Green Sheet Paste

First, an additive material mixture was produced in the same way as in the green sheet paste of the example 1.

Then, the additive material mixture obtained as above in an amount of 4.3 parts by weight, ethyl acetate in an amount of 6.85 parts by weight and a dispersant in an amount of 0.04 part by weight were mixed and pulverized by using a ball mill to obtain additive slurry. The mixing and pulverizing were performed under a condition of using a 250 cc polyethylene resin container and adding 2 mm$\phi$ $ZrO_2$ media in an amount of 450 g at rotation rate of 45 m/minute for 16 hours. Note that a particle diameter of the additive material after pulverizing was 0.1 μm in a median size.

Next, the additive slurry obtained as above in an amount of 11.2 parts by weight, $BaTiO_3$ powder (BT-02 made by Sakai Chemical Industry Co., Ltd.) in 100 parts by weight, ethyl acetate in 163.76 parts by weight, toluene in 21.48 parts by weight, a dispersant in 1.04 parts by weight, PEG400 (antistatic agent) in 0.83 part by weight, diacetone alcohol in 1.04 parts by weight, benzilbutyl phthalate (plasticizer) in 2.61 parts by weight, butyl stearate in 0.52 part by weight, mineral spirits in 6.78 parts by weight and organic vehicle in 34.77 parts by weight were mixed by using a ball mill to obtain green sheet paste. Note that mixing by a ball mill was performed under the condition of using a 500 cc polyethylene resin container and adding 2 mm$\phi$ $ZrO_2$ media in an amount of 900 g at a rotation rate of 45 m/minute for 20 hours. Also, the organic vehicle was produced by mixing to dissolve an acrylic resin in an amount of 15 parts by weight in ethyl acetate in an amount of 85 parts by weight at 50° C. Namely, a resin content (an amount of the acrylic resin) in the organic vehicle was 15 wt %. Note that a copolymer of methyl methacrylate (MMA) having a molecular weight of 450000, acid value of 5 mgKOH/g and Tg of 70° C. and butyl acrylate (BA) was used as the acrylic resin (MMA/BA=82/18 in weight ratio).

Evaluation 2

The example 3 using an acrylic resin as a binder for the green sheet instead of a polyvinyl butyral resin exhibited preferable results that the nonadhesion defect rate and short-circuiting defect rate were low in the same way as in the example 1. Namely, in the example 3, the nonadhesion defect rate was 0% and the short-circuiting defect rate was 10%. From the results, it was confirmed that the effects of the present invention can be sufficiently brought out even when using an acrylic resin as a binder for the green sheet.

The invention claimed is:

1. A production method of a multilayer electronic device, comprising the steps of:
   forming an electrode layer on a first support sheet;
   forming a green sheet on a surface of said electrode layer to obtain a green sheet having said electrode layer;
   stacking a plurality of said green sheet, each having the electrode layer, to form a green chip; and
   firing said green chip;
   wherein
   before stacking the plurality of said green sheet, each having the electrode layer, an adhesive layer is formed on a surface on the opposite side of the electrode layer side of said green sheet having the electrode layer;
   said green sheet having the electrode layer formed thereon is stacked via said adhesive layer;
   a thickness of said adhesive layer is 0.02 to 0.09 μm; and
   said electrode layer is formed in a predetermined pattern on a surface of said first support sheet, a blank pattern layer having substantially the same thickness as that of said electrode layer is formed on a surface of said first support sheet where said electrode layer is not formed on, and said blank pattern layer is formed by substantially the same material as that of said green sheet.

2. The production method of a multilayer electronic device as set forth in claim 1, wherein said green sheet is formed on a surface of said electrode layer without using an adhesive layer.

3. The production method of a multilayer electronic device as set forth in claim 1, wherein a thickness of said green sheet was 1.5 μm or thinner.

4. The production method of a multilayer electronic device as set forth in claim 1, wherein a thickness of said electrode layer is 1.5 μm or thinner.

5. The production method of a multilayer electronic device as set forth in claim 1, wherein a total thickness of said green sheet and said electrode layer is 3.0 μm or thinner.

6. The production method of a multilayer electronic device as set forth in claim 1, wherein:
   before stacking said green sheet having the electrode layer, said first support sheet is released from said green sheet having the electrode layer; and
   stacking on another green sheet a surface of the electrode layer side of said green sheet having the electrode layer in a state where said first support sheet is released.

7. The production method of a multilayer electronic device as set forth in claim 1, wherein:
   an opposite surface of the electrode layer side of said green sheet having the electrode layer is stacked on another green sheet in a state of having said first support sheet; and
   after stacking said green sheets having the electrode layer, said first support sheet is released from said green sheet having the electrode layer formed thereon.

8. The production method of a multilayer electronic device as set forth in claim 1, wherein said adhesive layer is formed by transferring an adhesive layer from other layer side to the surface on the opposite side of the electrode layer side.

9. The production method of a multilayer electronic device as set forth in claim 8, wherein said adhesive layer is first formed to be able to be released on a surface of a second support sheet and transferred to a surface on the opposite side of the electrode layer side of said green sheet having the electrode layer formed thereon by being pressed against it.

10. The production method of a multilayer electronic device as set forth in claim 1, wherein said adhesive layer is formed by a coating method.

* * * * *